United States Patent [19]

Egerton et al.

[11] Patent Number: 5,460,770
[45] Date of Patent: Oct. 24, 1995

[54] METHOD FOR PROTECTING SHAPED ARTICLES FROM ATTACK BY WATER

[75] Inventors: Terence A. Egerton, Cleveland; Kevin A. Fothergill, County Durham; Graham P. Dransfield, Cleveland, all of England

[73] Assignee: Tioxide Group Plc, London, England

[21] Appl. No.: 13,243

[22] Filed: Feb. 3, 1993

Related U.S. Application Data

[62] Division of Ser. No. 530,614, May 30, 1990, abandoned.

[30] Foreign Application Priority Data

Jun. 15, 1989 [GB] United Kingdom ............... 8913819

[51] Int. Cl.$^6$ ................................. B29C 71/00
[52] U.S. Cl. .................... 264/340; 264/56; 427/215; 427/331; 427/419.3
[58] Field of Search ............................ 427/230, 331, 427/215, 419.3; 264/340, 56

[56] References Cited

U.S. PATENT DOCUMENTS

| | | |
|---|---|---|
| 253,344 | 2/1882 | Chichester . |
| 3,066,391 | 12/1962 | Vordahl ............................ 29/182.5 |
| 3,926,567 | 12/1975 | Fletcher et al. ............... 29/182.5 |
| 3,989,872 | 11/1976 | Ball . |
| 4,018,388 | 4/1977 | Andrews ............................ 241/5 |
| 4,266,979 | 5/1981 | Miyoshi et al. ............... 501/103 |
| 4,495,907 | 1/1985 | Kamo ............................ 427/230 |
| 4,504,017 | 3/1985 | Andrews ............................ 241/40 |
| 4,582,766 | 4/1986 | Isenberg et al. ............... 429/30 |
| 4,599,270 | 7/1986 | Rangaswamy et al. ....... 427/453 |
| 4,626,518 | 12/1986 | Watanabe et al. ............. 501/104 |
| 4,671,740 | 6/1987 | Ormiston et al. ............. 416/241 B |
| 4,719,091 | 1/1988 | Wusirika ............................ 423/82 |
| 4,792,098 | 12/1988 | Haddow ............................ 241/5 |
| 4,820,593 | 4/1989 | Egerton et al. ............... 428/698 |
| 4,847,172 | 7/1989 | Maskalick et al. ............ 429/30 |
| 4,851,293 | 7/1989 | Egerton et al. ............... 428/698 |
| 4,985,379 | 1/1991 | Egerton et al. ............... 427/376.2 |

FOREIGN PATENT DOCUMENTS

| | | |
|---|---|---|
| 0013599 | 7/1980 | European Pat. Off. . |
| 0026666 | 8/1981 | European Pat. Off. . |
| 0080258 | 6/1983 | European Pat. Off. . |
| 0140638 | 5/1985 | European Pat. Off. . |
| 0169637 | 1/1988 | European Pat. Off. . |
| 0292250 | 11/1988 | European Pat. Off. . |
| 2738980 | 3/1979 | Germany . |
| 3633309 | 4/1987 | Germany . |
| 55-121969 | 3/1979 | Japan . |
| 5121969 | 6/1979 | Japan . |
| 57-191234 | 11/1982 | Japan . |
| 58-176127 | 10/1983 | Japan . |
| 1077665 | 9/1984 | Japan . |
| 61-77665 | 9/1984 | Japan . |
| 13076141 | 2/1984 | U.S.S.R. . |
| 533015 | 2/1941 | United Kingdom . |
| 592967 | 7/1944 | United Kingdom . |
| 634723 | 2/1946 | United Kingdom . |
| 645146 | 12/1947 | United Kingdom . |
| 667763 | 5/1948 | United Kingdom . |
| 671580 | 5/1952 | United Kingdom . |
| 785679 | 10/1957 | United Kingdom . |
| 1256421 | 1/1969 | United Kingdom . |
| 1392189 | 4/1971 | United Kingdom . |
| 1234043 | 6/1971 | United Kingdom . |
| 1417574 | 5/1972 | United Kingdom . |
| 1395700 | 12/1972 | United Kingdom . |
| 1411369 | 7/1974 | United Kingdom . |
| 1388032 | 3/1975 | United Kingdom . |
| 1491362 | 11/1977 | United Kingdom . |
| 1491361 | 11/1977 | United Kingdom . |
| 1519314 | 7/1978 | United Kingdom . |
| 2045642 | 11/1980 | United Kingdom . |
| 1589930 | 5/1981 | United Kingdom . |
| 2091127 | 7/1982 | United Kingdom . |
| 2111855 | 7/1983 | United Kingdom . |
| 2181723 | 4/1987 | United Kingdom . |
| 2197804 | 6/1988 | United Kingdom . |
| 2204030 | 11/1988 | United Kingdom . |
| 2205631 | 12/1988 | United Kingdom . |
| WO8203876 | 11/1982 | WIPO . |

OTHER PUBLICATIONS

Toyosoda Manufacturing Co. Ltd., TSK Ceramics Tech. Bulletin.

R. Stevens, "Zironia And Zironia Ceramics," Second Edition, pp. 28–31, Jul., 1986.

*Primary Examiner*—Janyce Bell
*Attorney, Agent, or Firm*—Baker & Botts

[57] ABSTRACT

An article is provided which has a surface which is contactable in use with water at a temperature of at least 100° C. The surface of the article is protected from attack by the water, because it is formed of a shaped fired ceramic material which is formed from particulate zirconia having a coating on the particles thereof of a hydrous oxide of yttrium and optionally also a hydrous oxide of zirconium, titanium or aluminum. Preferably the particles have a diameter of not more than 0.5 micron and the amount of hydrous oxide of yttrium falls within the range 0.5 to 10 mole percent as $Y_2O_3$ on moles of zirconia. Typical articles are internal combustion engines and parts thereof, mills and impact plates therefor, and pump surfaces. Fuel cells are also described.

13 Claims, 2 Drawing Sheets

METHOD FOR PROTECTING SHAPED ARTICLES FROM ATTACK BY WATER

This application is a division of application Ser. No. 07/530,614, filed May 30, 1990, now abandoned.

FIELD OF THE INVENTION

This invention relates to shaped articles and particularly to shaped articles in which at least part is composed of a ceramic material.

SUMMARY OF THE INVENTION

According to the present invention an article includes a shaped fired ceramic material formed from particulate zirconia having a coating on the particles of a hydrous oxide or oxide of yttrium and said ceramic material forming a surface of said article and said surface being contactable in use with water at a temperature of at least 100° C.

The present invention provides an article which has a surface formed of a ceramic which is formed from a stabilised zirconia which includes yttria in a specialised location which confers on the ceramic a high resistance to attack by water at a temperature of at least 100° C. Yttria stabilised zirconias which have been prepared by admixing zirconia and yttria or by co-precipitating zirconia and yttria from solutions do not have an acceptable resistance to attack by water at a temperature of at least 100° C. and consequently have found little use in such applications despite having such desirable properties, as an initial high strength. The reduction of the strength through water attack has been a serious disadvantage. The articles of the present invention have a much improved resistance to water attack and retain the advantages associated with yttria stabilisation of zirconia.

DETAILED DESCRIPTION OF THE INVENTION

Figure 1:
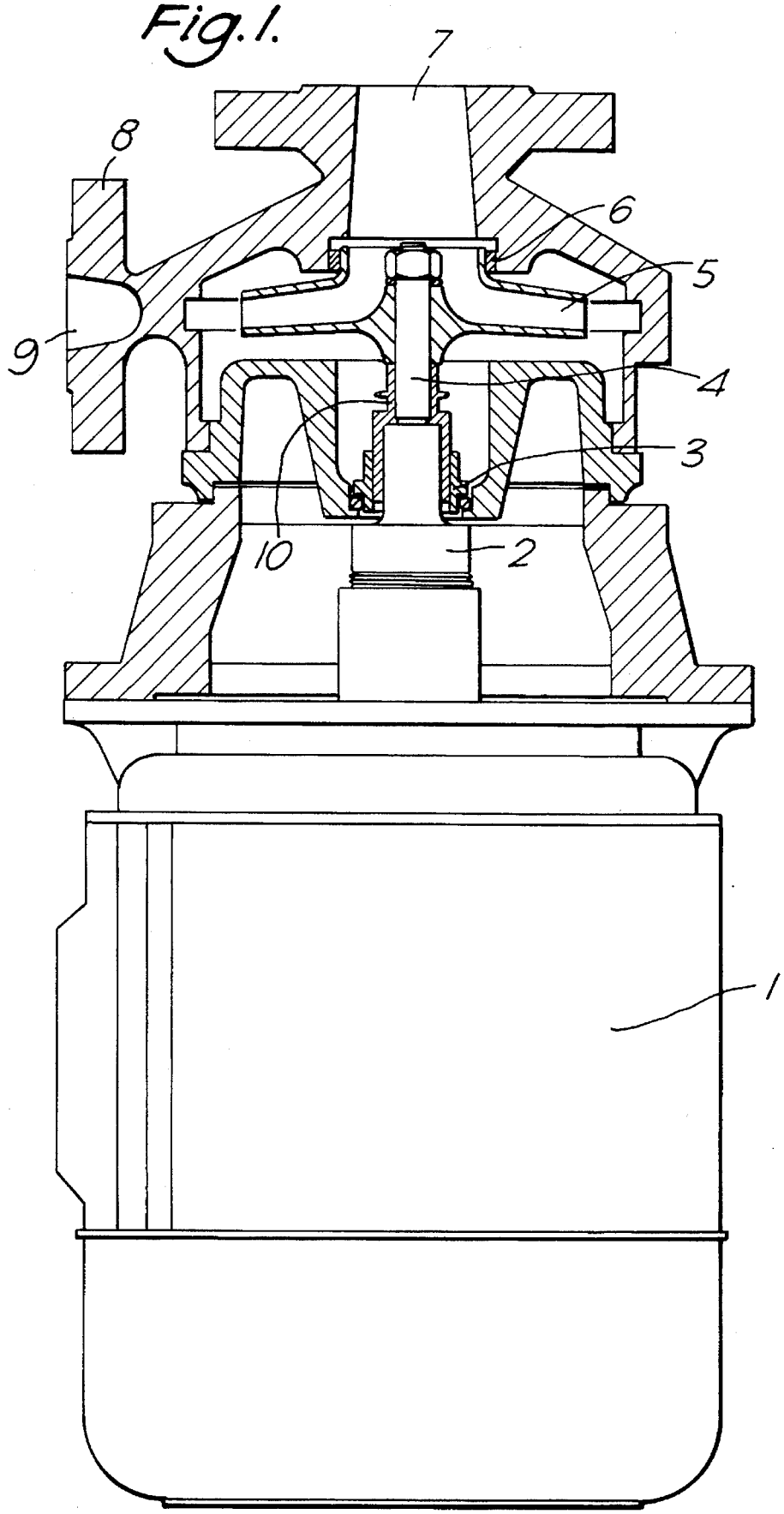
FIG. 1 is a cross-section of a pump.

The ceramic material is prepared by firing zirconia which is coated with a hydrous oxide or oxide of yttrium. Preferably the zirconia has a particle size such that the majority of the particles have a diameter of not more than 0.5 microns and preferably less than 0.2 microns.

The particles of the zirconia which are coated with the hydrous oxide or oxide of yttrium also can be coated with an oxide or hydrous oxide of zirconium, titanium or of aluminium. Preferably where these other oxides/hydrous oxides are present then the other oxide or hydrous oxide forms an initial or inner layer directly on the surface of the zirconia particle. In the case of the most preferred ceramic material the zirconia employed also has a coating of hydrous zirconia or hydrous titania or mixture thereof.

Typically the particles of zirconia have a coating of a hydrous oxide of yttrium in an amount of from 0.5 to 10 mole percent expressed as $Y_2O_3$ on mole of zirconia. Preferably the amount of hydrous yttria is from 2 to 5 moles percent $Y_2O_3$. When a hydrous oxide of zirconium, titanium or aluminium is present as a coating on the particles then usually the amount of the hydrous oxide is from 0.2 to 5 mole percent expressed as the respective oxide on moles of zirconia, preferably the amount of the hydrous oxide of zirconium, titanium or aluminium is from 0.5 to 2 mole percent.

The particulate zirconia used to form the basis of the ceramic material is preferably formed by the vapour phase oxidation of an oxidisable vapourised zirconium compound. Typical zirconium compounds which can be oxidised in the vapour state are the zirconium halides, particularly, zirconium tetrachloride. The oxidation in the vapour state usually is carried out by mixing the zirconium chloride with an excess of heated oxygen under such conditions that oxidation of the zirconium tetrachloride takes place and the desired sized zirconia is obtained directly on cooling and separating from the gas stream. A preferred method of heating the oxygen to react with the zirconium tetrachloride is to pass the oxygen through an electric arc between two electrodes supplied with electrical power at an appropriate voltage and amperage which commonly generates a so-called electrical plasma. This form of manufacture of the particulate zirconia has an advantage in that the product is obtained in the oxide form directly and that the oxidation process can be controlled so that the particle size of the product is as near to that desired as possible to obtain without extensive grinding of the product being required before treatment with the coatings.

If desired the oxidation can be carried out in the presence of an oxidisable aluminium compound, such as an aluminium halide, eg aluminium chloride to produce tetragonal zirconia. Amounts of aluminium compound sufficient to introduce from 1.0 percent to 10 percent by weight of Al on weight of $ZrO_2$ into the tetragonal zirconia are generally employed.

Usually also the particulate zirconia which is used to form the shaped fired ceramic material is substantially free of silica and preferably the amount of silica does not exceed 0.1 percent by weight Si on $ZrO_2$. Also the material is substantially free of sodium and preferably contains less sodium than 300 ppm as Na and most preferably less than 100 ppm as Na.

The coated zirconia is obtained by treating the particulate zirconia in such a manner that the oxide or hydrous oxide of yttrium is deposited as a coating on the surface of the particles of zirconia. Preferably the coating operation is carried out as a wet treatment process in which a hydrous oxide of yttrium together with any desirable other specified hydrous oxide is deposited on the zirconium oxide particles.

Hydrous oxide coatings are deposited by hydrolysis of an appropriate hydrolysable compound of yttrium, zirconium, titanium and/or aluminium. Clearly if the hydrous oxide other than that of yttrium is to form an inner layer then the hydrolysis product of this other metal is precipitated on the zirconia before the compound of yttrium.

After coating the particles are separated, dried and milled as is desired.

The method employed for the manufacture of the shaped fired ceramic material depends on the type of the particular shaped material but generally the particulate zirconia will be shaped into a ceramic is green body by die pressing, moulding or any other suitable technique and fired. Typically the ceramic green body is fired at a temperature within the range 1200° C. to 1800° C., preferably 1300° C. to 1550° C. If desired the particulate zirconia can be mixed with a binding agent prior to shaping.

The articles of the present invention all have a common feature. There is present in each article at least one surface formed from a shaped fired ceramic material formed from the particulate zirconia and the surface is one which is to be contactable in use with water at a temperature of at least 100° C. Water can be present as a liquid, vapour or in gaseous form and can be present solely as water or can be present as a mixture with another ingredient e.g. the combustion products of fuels.

Articles of the present invention can be of many different types but particularly the most advantageous properties of the shaped fired ceramic material means that they find use in internal combustion engines, mills, pumps and fuel cells.

Internal combustion engines according to the invention are those engines which use a fuel to generate a propulsive force such as reciprocating engines, jet or gas turbine engines, or rotary engines. There are many surfaces in an internal combustion engine which contact a water containing gas at a high temperature, certainly well in excess of 100° C. and such surfaces are those of valves, valve guides and valve seats, cylinder liners, exhaust parts and piston crowns. Many replaceable essential parts of such engines such as sparking plugs and turbocharger impellers can be formed from the shaped fired ceramic material. Particularly useful applications for the ceramic material are those surfaces which are subjected to wear occasioned by rotational or reciprocatory motion.

Another type of article usefully having a shaped fired ceramic surface is a mill with an impact surface formed of the zirconia ceramic. Typically the mill can be an impact mill in which a stream of particles to be ground is projected on to the impact surface in a stream of steam at a temperature greater than 100° C. to shatter the particles to a smaller size. The impact mill surface on which the particles impinge will usually be in the form of a moulded plate from the particulate zirconia.

Many types of pump are expected to operate under conditions in which articles of the present invention are specifically designed to withstand. Rotors, impellers, shafts, casings and bearing surfaces of pumps can be formed from the zirconia particulate material.

Another type of article manufactured in accordance with the invention is a fuel cell in which fuel is converted to electrical energy e.g. from hydrogen and oxygen or from methane and oxygen or from methanol and oxygen. Accordingly a fuel cell can be formed at least from a shaped ceramic material of said zirconia of the invention and suitably located electrodes. One or more of the electrodes may also contain said zirconia.

According to the present invention also a composition suitable for the manufacture of a shaped fired ceramic material comprises particulate zirconia having a coating on the particles thereof of an oxide or hydrous oxide of titanium in an amount of least 6 mole per cent expressed as $TiO_2$ on moles of zirconia and an oxide or hydrous oxide of yttrium in an amount of from 0.5 to 10 mole percent and preferably from 1 to 5 mole percent. Preferably the composition comprises particulate zirconia having on the particles thereof a coating of a hydrous oxide of titanium as an inner coating and said coating of a hydrous oxide of yttrium as an outer coating. Such a composition carrying a coating of an oxide or hydrous oxide of titanium with the oxide or hydrous oxide have been shown to possess particularly advantageous properties when used as ceramics.

Figure 2:
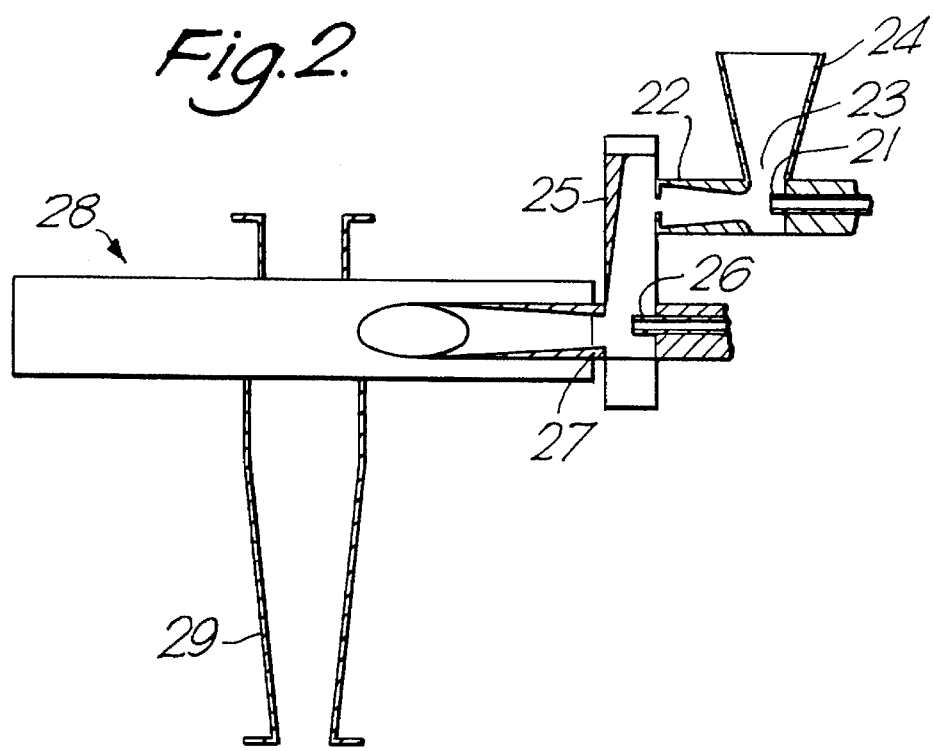
FIG. 2 is a part-sectional view of an impact mill and separator.

Three forms of articles constructed and arranged in accordance with the invention will now be described by way of example only and with reference to the accompanying drawings in which:

FIG. 1. is a cross-section of a pump,

FIG. 2. is a part-sectional view of an impact mill and separator, and

Figure 3:
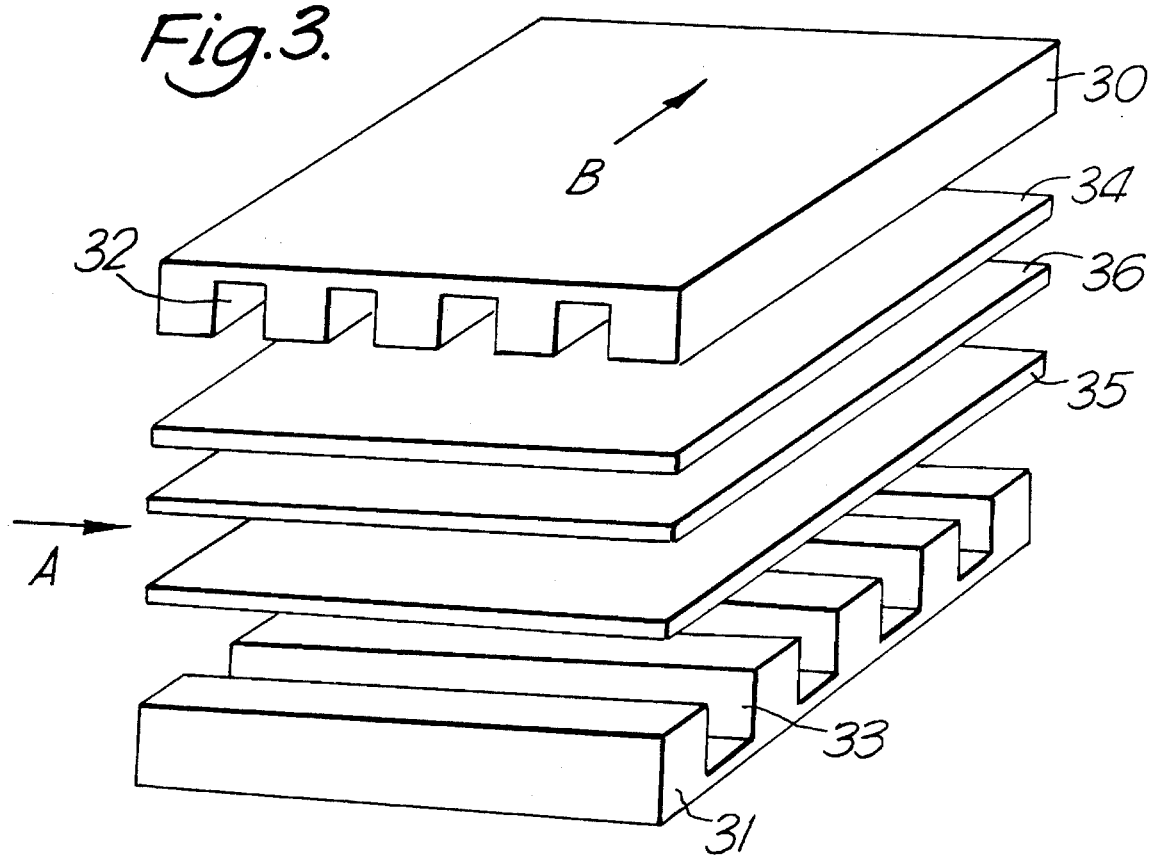
FIG. 3 is a view of a fuel cell.

FIG. 3. is a view of a fuel cell.

As shown in FIG. 1 a pump comprises an electric motor 1 having a stub shaft 2 mounted within a mechanical seal and bearing assembly 3. The stub shaft 2 is attached to an impeller mounting shaft 4 carrying the pump impeller 5 rotatable within a wear ring or seal 6 to pump a fluid from a fluid inlet 7. The impeller 5 is rotatable within a casing 8 provided with an outlet 9 for the fluid. The impeller mounting shaft has a sleeve 10. In such a pump one or more of the suitable parts can be formed of a ceramic material in accordance with the invention and particularly parts 3, 4, 5, 6 and 10 can be so formed.

As shown in FIG. 2 the mill consists of first jet nozzle 21 axially aligned but spaced from a venturi 22. Between the nozzle 21 and venturi 22 is an inlet 23 for powder material from a hopper 24. An impact surface 25 constructed from a ceramic material of the invention is mounted to receive material from the venturi 22 and reflect the milled powder towards a second jet nozzle 26 supplied from a second venturi 27 axially aligned with the jet nozzle 26. The second venturi 27 forms a powder feed device to feed powder into a cylindrical separation chamber 28 which also can act as a conventional fluid energy mill.

In operation the powder material to be ground is fed from hopper 24 through the feed inlet 23 and becomes entrained in steam supplied through jet nozzle 21. The steam together with the entrained material is fed through venturi 22 and directed on to the impact surface 25 where milling takes place due to impact with the surface prior to being reflected towards the second jet nozzle 26. Further milling occurs within chamber 28 due to impact of the particles with each other and the milled particles exit chamber 28 through the particle offtake 29.

One form of a fuel cell is shown in exploded view in FIG. 3. As shown the cell consists of two end plates 30 and 31 each having transverse channels 32, 33 respectively located at right angles to one another. An anode 34 is positioned adjacent the upper end plate 30 and a cathode 35 adjacent the lower end plate 31. Between the two electrodes is a permeable ceramic plate 36 formed of a fired zirconia in accordance with the invention. This ceramic plate 36 is permeable by oxygen which is introduced into the cell via transverse channels 33 in the direction of the arrow A and a fuel is introduced into the cell via channels 32 located in the top plate and in the direction of the arrow B. As the fuel is oxidised an electric current is produced and conducted from the cell by the two electrodes.

The invention is also illustrated by the following Examples.

EXAMPLE 1

Zirconium oxide particles of approximately 0.1 microns in diameter prepared by the vapour phase oxidation of zirconium tetrachloride were dispersed in water at a concentration of 150 grams per liter. As a result of the reaction of residual Zr-Cl groups with water the dispersion obtained had a pH value of 1.7.

An aqueous solution of acid zirconium sulphate (containing the equivalent of 100 grams per liter $ZrO_2$) was added to the dispersion in an amount sufficient to introduce hydrous zirconia in an amount of 1% by weight as $ZrO_2$ on solids. To the dispersion obtained there was then added an aqueous solution of yttrium chloride (containing the equivalent of 186 grams per liter $Y_2O_3$) in an amount sufficient to introduce 4.7% by weight $Y_2O_3$ on solids. The pH was raised with ammonium hydroxide (10% w/w) to a value of 8.5 over a period of 45 minutes and the dispersion was then stirred for a further 30 minutes. The solution filtered quickly and the filter cake was washed, dried and milled for 16 hours in a ball mill in isopropyl alcohol at a concentration of 300 grams per liter using zirconia grinding media, having a size of 1 cm×1 cm. The grinding medium was removed by sieving and the alcohol evaporated on a water bath.

Analysis of the product showed the presence of the equivalent of 4.25% by weight $Y_2O_3$ in the form of the hydrous oxide as coating on the particles.

The quality of the yttria/zirconia coated powder was assessed by single ended die-pressing the powder, at 30 MPa into 20 discs of approximately 30 mm diameter. The discs were fired at 1450° C. The strength (modulus of rupture) of 10 discs was measured by a three-point biaxial test, from which a mean value of 1210 MPa (Standard Deviation 19%) was derived. The density of the discs was measured by mercury densometry and a mean value of 5.95 g/cm$^3$ was obtained. A further 10 sintered discs were immersed in distilled water in an autoclave at 180° C. and pressure of 10.0 bar, following the method of Nakajima et al, Advances in Ceramics, Volume 12, pages 399–403 (1984) and thereby thermally aged for 90 hours.

Strength measurements on the aged discs produced a modulus of rupture having a mean value of 1072 MPa (Standard Deviation 6%). The density of the aged discs was found to be 5.74 g/cm$^3$.

For the sake of comparison, batches of discs of two commercially available (uncoated) powders prepared by co-precipitation, containing 5–5.5% by weight $Y_2O_3$, were pressed, sintered at 1450°–1550° C. and aged. After ageing for 24 hours all the sintered discs of these powders had failed, retaining no strength whatsoever. Final densities of the residues of the aged discs were below 5.5 g/cm$^3$.

Ageing of the test pieces in an autoclave by the method described is intended to simulate more severe conditions of use than those actually to be experienced.

EXAMPLE 2

Zirconium oxide particles of approximately 0.1 microns in diameter prepared by the vapour phase oxidation of zirconium tetrachloride were dispersed in water at a concentration of 150 grams per liter. As a result of the reaction of residual Zr-Cl groups with water, the dispersion obtained had a pH value of 1.2.

The dispersion was heated to 50° C. and an aqueous solution of acid zirconium sulphate (containing the equivalent of 100 grams per liter $ZrO_2$) was added to the dispersion in an amount sufficient to introduce hydrous zirconia in an amount of 1% by weight as $ZrO_2$ on solids. To the dispersion obtained there was then added an aqueous solution of yttrium chloride (containing the equivalent of 186 grams per liter $Y_2O_3$) in an amount sufficient to introduce 5.3% by weight $Y_2O_3$ on solids and an aqueous solution of titanyl sulphate (containing the equivalent of 35 grams per liter $TiO_2$) in an amount sufficient to introduce 5.3% by weight $TiO_2$ on solids. The pH was raised with ammonium hydroxide solution (10% w/w) to a value of 8.5 over a period of 45 minutes and the dispersion was then stirred for a further 30 minutes at a temperature of 50° C. The solution filtered quickly and the filter cake was washed, dried and milled for 18 hours in a ball mill in isopropyl alcohol at a concentration of 300 grams per liter, using zirconia grinding media having a size of 1 cm×1 cm. The grinding medium was removed by sieving and the alcohol evaporated on a water bath.

Analysis of the product showed the presence of the equivalent of 3.8% by weight $Y_2O_3$, as coating and 4.5% by weight $TiO_2$ as coating.

The quality of the powder was assessed by single-ended die pressing as described in Example 1. The discs were fired at 1500° C. The strength of the discs was measured by the method described in Example 1, from which a mean value of 798 MPa (standard deviation of 38%) was derived, the density of the discs was found to be 5.82 g/cm$^3$.

Eight sintered discs were dipped in distilled water and aged for 45 hours, following the method described in Example 1. Strength measurements on the aged discs produced a modulus of rupture having a mean value of 1027 MPa (standard deviation of 10%). The density of the discs was found to be 5.80 g/cm$^3$.

Products according to the invention produced in Examples 1 and 2 will have value in combustion engines, pumps, mills and fuel cells.

EXAMPLE 3

The procedure of Example 1 was repeated except that the powder after coating and grinding actually contained 4.32% by weight $Y_2O_3$ in the form of the hydrous oxide coating on the particles. The quality of the powder was assessed as described in Example 1 and the strength (modulus of rupture) was measured from which a mean value of 1102 MPa (standard deviation of 15%) was derived. The measured density of the discs gave a mean value of 5.87 g/cm$^3$. A further 10 sintered discs were immersed in distilled water and aged according to the procedure of Example 1 for 200 hours. Strength measurements on the aged discs produced a modulus of rupture having a mean value of 969 MPa (standard deviation of 4%). The density of the aged discs was found to be 5.78 g/cm$^3$.

EXAMPLE 4

The procedure of Example 2 was repeated. 4 sintered discs obtained from the powder were immersed in distilled water and aged for 90 hours following the method described in Example 1. Strength measurements on the aged discs produced a modulus of rupture having 1048 MPa (Standard Deviation of 7%). The density of the discs was found to be 5.82 g/cm$^3$.

EXAMPLE 5

A powder made by the method of Example 1 but containing about 4.4 by weight percent yttria was moulded into the form of plates and sintered at about 1500° C. The plates were broken and pieces tested by immersing in hydrochloric acid (20 w/w). The exact procedure was to place a piece of the broken plate in a round bottomed one liter flask with 500 mls of hydrochloric acid which was then maintained at 108° C. for 3.5 days while maintaining under reflux. The treated samples were then washed in acetone and dried at 105° C. The degree of attack by the hydrochloric acid under these conditions was measured by weight loss of the samples under test.

The sample having an initial weight of 34.201 grams did not suffer any measurable weight loss. For the sake of comparison sintered pieces made from a commercially available (uncoated powder) were immersed in 20 w/w hydrochloric acid under the same conditions. After 4 days it was found that the pieces of this material had been completely destroyed.

The conditions of the test were designed to simulate those experienced by ceramic reactor vessel linings subjected to digestion liquor in the extraction of pigmentary titanium dioxide from its ores using hydrochloric acid as the liquor.

We claim:

1. A method for protecting an article from attack by water having a temperature of at least 100° C. comprising the steps of:

(a) depositing on the surface of particles of zirconia a coating of an oxide selected from the group consisting of hydrous oxides of yttrium and oxides of yttrium;

(b) shaping the coated particulate zirconia into a ceramic green body, (c) firing said ceramic green body to form a shaped, fired ceramic article having at least one surface formed from said coated particulate zirconia; and (d) contacting said surface of said article with water having a temperature of at least 100° C.

2. A method according to claim 1, wherein the particulate zirconium has a particle size such that the majority of the particles thereof have a diameter of not more than 0.5 micron.

3. A method according to claim 1 in which the particles of zirconia have a coating of hydrous oxide of yttrium in an amount of from 0.5 to 10 mole percent expressed as $Y_2O_3$ on moles of zirconia.

4. A method according to claim 1 in which the particles of zirconia are also coated with an oxide or hydrous oxide of zirconium, titanium or aluminum.

5. A method according to claim 4 in which the amount of the hydrous oxide of zirconium, titanium or aluminum is from 0.2 to 5 mole percent expressed as the respective oxide on moles of zirconia.

6. A method according to claim 1 in which said ceramic material forms a surface of an internal combustion engine.

7. A method according to claim 6 in which said surface is a surface of a valve, a valve guide, a valve seat, a cylinder liner, a piston crown or of an exhaust part.

8. A method according to claim 1 in which an exposed portion of said article comprises a surface of a sparking plug.

9. A method according to claim 1 in which an exposed portion of said article comprises a surface of an impeller for a turbo-charger.

10. A method according to claim 1 in which an exposed portion of said article comprises a surface of an impact plate for a mill.

11. A method according to claim 1 in which an exposed portion of said article comprises a surface of a pump.

12. A method according to claim 1 in which an exposed portion of said article comprises a surface of a fuel cell.

13. A method according to claim 1 in which an exposed portion of said article comprises a surface of a permeable ceramic plate.

* * * * *